United States Patent

[11] 3,617,304

[72] Inventor Josse Rahm
 454, Ave. Dolez, Uccle, Belgium
[21] Appl. No. 756,191
[22] Filed Aug. 29, 1968
[45] Patented Nov. 2, 1971
[32] Priority Sept. 12, 9167
[33] Luxembourg
[31] 54.457

[54] METHOD FOR MANUFACTURING BISCUITS INTENDED TO BE BROUGHT INTO CONTACT WITH ICE CREAM
6 Claims, No Drawings
[52] U.S. Cl.................................................. 99/86,
 99/88, 99/89, 107/58
[51] Int. Cl...................................................... A21d 2/36,
 A21d 8/08
[50] Field of Search............................................ 99/89, 88,
 86; 107/58

[56] References Cited
UNITED STATES PATENTS

| | | | |
|---|---|---|---|
| 2,124,723 | 7/1938 | Wharmby...................... | 107/58 |
| 2,749,853 | 6/1956 | Graham........................ | 107/58 |
| 2,785,980 | 3/1957 | Washburn.................... | 99/88 |

*Primary Examiner*—Raymond N. Jones
*Assistant Examiner*—James R. Hoffman
*Attorney*—Sughrue, Rothwell, Mion, Zinn & Macpeak ABSTRACT: This invention relates to a method for producing baked wafer biscuits, particularly cone-shaped biscuits intended to be used with ice cream. The biscuit is molded in a mold made of two separable pieces from an unleavened paste containing fat in a minimum proportion of about 10 percent of the weight of farinaceous material, a proportion of buckwheat flour lying between 1.8 and 5.5 percent of the weight of farinaceous material, and wherein the two pieces of the mold are separated several times, each time permitting a partial escape of the steam formed during the baking, the biscuit being cooled by a jet of gas before being removed from the mold.

METHOD FOR MANUFACTURING BISCUITS INTENDED TO BE BROUGHT INTO CONTACT WITH ICE CREAM

The invention relates to a method of producing baked wafer biscuits, such as cones, intended for use with ice cream or any other confectionery cream, this method comprising forming a paste containing fat and a farinaceous material, molding the paste into a wafer biscuit in a mould made of two separable pieces, baking the biscuit in the mold and removing the thus baked biscuit from the mold.

A known method for producing a molded wafer cone biscuit comprises forming a paste containing fat and a farinaceous material, molding the paste into a wafer biscuit in a mold made of two separable pieces, baking the biscuit in the mold and removing the thus baked biscuit from the mold. In a known method for producing molded wafer cones, use is made of a paste of a leavened dough containing a proportion of sugar that is much less than that contained in the dough used in cones made by rolling up while hot, a sugared flat biscuit containing comparatively little fat. The cones obtained by the latter method are more tasty than those formed by molding leavened dough of low sugar content, but, besides the price of the dough, they are more expensive to produce than molded cones; moreover, they are difficult to manipulate and fill with cream. Although rolled cones take longer to absorb moisture than molded cones containing cream, they remain unsuitable for prolonged refrigerated storage between the time of filling and consumption. A tasty dough, used for rolled cones is quite unsuitable for the production of cones by molding between the above-described two pieces of the mold, one of which is a convex piece placed inside the other piece which is a concave piece. This difficulty is inherent in that the cone, freshly molded and only partly baked, adheres to the convex piece when this is withdrawn from the concave piece, to allow the steam, which is formed predominantly at the beginning of the baking process, to escape. The adhesion of the dough to the two pieces of the mold increases in proportion to the fat contained in the dough.

It is an object of the present invention to provide a method that will be free from the disadvantage of adherence, irrespective of the form assumed by the biscuit. The method of this invention comprises the improvement of using for the above-described paste, an unleavened past containing the fat in a minimum proportion of about 10 percent by weight to the weight of the farinaceous material, the farinaceous material containing buckwheat flour at a level of from 1.8 to 5.5 percent by weight to the total amount of farinaceous material present, the improvement further comprising separating both separable pieces from each other several times during the baking, to allow at each time a partial escape of steam, and cooling the baked biscuit with a jet of gas before the biscuit is removed from the mold.

In the present specification the term "farinaceous material" denotes the mixture of powdery ingredients which, upon being mixed with water, constitute the basic elements of the baking dough. These ingredients consist essentially of wheat flour, to which a little of other flours, such as maize flour, may sometimes be added. Although potato starch does not constitute flour in the usual meaning of this word in food industry, in the present specification the term "farinaceous material" incorporates potato starch when this is used jointly with wheat flour.

The inclusion of a considerable proportion of fat in the absence of leaven results in making the biscuit impervious, which ensures its long preservation having been filled with ice cream or any other confectionery cream.

Further, due to the presence of a considerable proportion of fat, the paste is not very porous nor pervious and the escape of the steam, at the beginning of the baking process is thus low. At this point in the baking process, the paste is not very consistent and it adheres partly to both pieces of the mold, if both pieces of the mold are separated from one another in the beginning of the baking process, for a time sufficient to allow all of the steam to escape, the paste on one of these pieces no longer coalesces with the paste on the other piece when these pieces are brought together.

With the method according to the invention it is possible to remove successfully all of the steam out of the paste of this invention and to effect the reunion or coalescence of the paste adhering partly to both pieces of the mold. For this end, in the method according to the invention, the steam escapes in several stages by the successive separating of both pieces of the mold for a short time, the pieces being momentarily brought together between the separations. These successive partings of both pieces of the mold are regulated in such a way that the paste has become sufficiently consistent when all of the steam has escaped. The features of the invention, avoiding any too hard adherence of the paste to both pieces of the mold and allowing sufficient coalescence of the paste adhering to both pieces, after the separation of the pieces, are inherent in the presence of the buckwheat flour in the paste and also in causing the steam to escape in several successive stages.

If up to 10 percent of fat is added to dough with leaven for producing molded biscuits the resulting biscuits cannot be kept for more than a few days in a refrigerating chest after having been brought in contact with cream.

Owing to the buckwheat flour in unleavened dough containing at least 10 percent fat the production and preservation of the baked biscuit in contact with cream for about a month becomes possible.

If the proportion of fat is increased the time of preservation without absorption of moisture lengthens and may attain nearly 4 months when the proportion of fat is approximately 22 percent in relation to the farinaceous material, while the proportion of buckwheat flour is about 4.5 percent in relation to the farinaceous material.

There is no point in exceeding 25 percent of fat, as too great a part of it is then expelled in the baking.

If the proportion of buckwheat flour is below 1.8 percent of the weight of farinaceous material the paste adhering to one of the mold pieces may not properly coalesce with that remaining in contact with the other piece, when the two pieces are brought together again after the escape of the steam. If the proportion of buckwheat flour is over 5.5 percent of the weight of farinaceous material the baked biscuits acquire a hardness intolerable to the consumer. With 4.15 percent of buckwheat flour a fairly impervious and crunchy biscuit is obtained.

The taste of the biscuit depends on the proportion of sugar it contains. It may be observed that in the case of leavened paste used in the manufacture of molded cones the proportion of 25 percent of sugar relative to farinaceous material has never been exceeded. Owing, however, to the presence of buckwheat flour in the paste used in the method according to the invention, the proportion of sugar can be increased. The paste may preferably contain a proportion of sugar equal to about 36 percent of the weight of the farinaceous material.

With highly sugared paste, such as may be used in the invention, the biscuit stays soft for a certain time after being fully baked. Its consistency is such that in the case where it takes the form of a cone its edge cannot be smoothed directly after its final removal from the convex piece of the mold, and if it were immediately withdrawn from the mold it would be deformed in dropping into the concave piece of the mold.

In order to remedy these drawbacks, it is proposed according to one convenient method to cool the interior of the cone by a jet of gas before scraping down the edge of the cone.

If the biscuit takes any other form it is equally advantageous to cool it with a gas jet before removal from the mold, in order to expedite this.

The invention will be more fully understood from the following description of one embodiment of the method of this invention.

In carrying the invention into effect according to one convenient mode by way of example, a mixture may be prepared of 100 kg. of wheat flour, 1 kg. of maize flour, 8 kg. of potato starch, 24 kg. of fat, 40 kg. of sugar and 4.5 kg. of buckwheat flour. To this is added a quantity of water that is strictly necessary to form a paste. The union between the water and the fat is assisted, in the known way, by the presence of lecithin. 1.2 kg. of soya lecithin is likewise introduced into the mixture for this purpose.

The paste obtained by mixing these various elements is used in a machine comprising essentially a movable endless chain. This chain serves for conveying molds adapted to forming conical horns. Every mold is made of two separable pieces, one of which, the so-called concave piece, is provided with a conical cavity and the other, the so-called convex piece, consists essentially of a conical protuberance corresponding to the conical cavity and adapted to be introduced inside the conical cavity. The paste is fed, in the known way, into the cavities of the concave pieces and the conical protuberances are then depressed into the said cavities. The molds are filled with paste. The paste is progressively baked between both pieces of the mold. The steam, which is generated mainly at the beginning of the baking process, can escape out of the paste and the molds, by withdrawing the convex pieces several times for a short period from the corresponding concave pieces. After the liberation of steam arising from this displacement of the convex pieces, these are reinserted into the concave pieces, in order to reunite the portions of the cones which have adhered to the convex and concave pieces of the mold respectively during their separation.

The baking process is continued and, when the cones are baked, the convex pieces are removed from the concave ones. After this removal the interior of the cones (which are in the concave pieces) is cooled by jets of gas. These jets may be fed by a blower or derive from a source of compressed gas. In the latter case the chilling caused by their expansion when leaving that source contributes to the rapid cooling of the cones.

Immediately after the cooling operation, that part of the cones which projects beyond the cavities of the concave pieces of the molds, can be removed by scraping the edge of the circular orifice of each of the conical cavities of the mold's concave pieces. The cones thus finished can be removed from the mold without being deformed.

What I claim is:

1. In a method of producing a baked wafer biscuit for use with ice cream or any other confectionery cream, comprising forming a paste containing fat and a farinaceous material, molding said paste into a wafer biscuit in a mold made of two separable pieces, baking said biscuit in said mold and removing the thus baked biscuit from said mold, the improvement which comprises said paste being an unleavened paste containing said fat in a minimum proportion of about 10 percent by weight to the weight of the farinaceous material, said farinaceous material containing buckwheat flour at a level of from 1.8 to 5.5 percent by weight to the total amount of farinaceous material, said improvement being further characterized as separating both separable pieces from each other several times during said baking, allowing at each time a partial escape of steam and cooling said baked biscuit with a jet of gas before said baked biscuit is removed from the mold.

2. The method as claimed in claim 1, wherein said paste contains about 22 percent by weight fat in relation to the farinaceous material.

3. The method as claimed in claim 1, wherein said paste contains about 4.15 percent by weight buckwheat flour in relation to the farinaceous material.

4. The method as claimed in claim 1, wherein said paste contains more than 25 percent by weight sugar in relation to the farinaceous material.

5. The method as claimed in claim 1, wherein said paste contains about 36 percent by weight sugar in relation to the farinaceous material.

6. In a method of producing a baked wafer biscuit in cone form for use with ice cream or any other confectionery cream, comprising forming a paste containing fat and a farinaceous material, molding said paste into a wafer biscuit in a mold made of two separable pieces, one of said pieces comprising a conical cavity and the other of said pieces comprising a conical protuberance adapted to be introduced inside said conical cavity, baking said biscuit in said mold, removing said conical protuberance from said conical cavity, scraping an orifice of said cavity, through which said protuberance passes when inserted in and removed from said cavity, and removing the thus baked cone biscuit from said conical cavity, the improvement which comprises said paste being an unleavened paste containing said fat in a minimum proportion of about 10 percent by weight to the weight of the farinaceous material, said farinaceous material containing buckwheat flour at a level of from 1.8 to 5.5 percent by weight to the total amount of farinaceous material, said improvement being further characterized as separating said conical protuberance from said conical cavity several times during said baking, allowing at each time a partial escape of steam and cooling said baked biscuit with a jet of gas before said baked biscuit is removed from the mold.

* * * * *